(12) United States Patent
Spannagel et al.

(10) Patent No.: US 6,331,683 B1
(45) Date of Patent: Dec. 18, 2001

(54) DRYING BALANCE WITH TEMPERATURE CALIBRATION DISK

(75) Inventors: Wilfried Spannagel, Göttingen; Karin Diedrich, Hardegsen; Olaf Dudda, Göttingen; Christian Baseler, Lübeck, all of (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 09/577,680

(22) Filed: May 22, 2000

(30) Foreign Application Priority Data

May 20, 1999 (DE) .......................... 299 08 892 U

(51) Int. Cl.[7] .......................... G01N 25/00; G01K 15/00; G01G 9/00
(52) U.S. Cl. .................. 177/245; 374/1; 374/14
(58) Field of Search .................. 374/1, 2, 3, 14; 177/245; 73/73

(56) References Cited

U.S. PATENT DOCUMENTS 4,798,252   1/1989   Knothe et al. ...................... 177/245

FOREIGN PATENT DOCUMENTS 3508 271 A1   9/1986   (DE) .
3706 609 C1   4/1988   (DE) .

Primary Examiner—Randy W. Gibson
(74) Attorney, Agent, or Firm—Sughrue, Mion, Zinn, Macpeak & Seas, PLLC

(57) ABSTRACT

In a drying balance with a balance pan (3) which rests removably on the load receiver (2) of a weighing system, a radiation source (19) for warming and drying a substance on the balance pan (3), and a temperature calibrating disk (4) with at least one built-in temperature sensor (11; 21), the load receiver (2) has a vertical hole (7) into which a pin (6) on the underside of the balance pan (3) protrudes. The housing (1) of the balance has an opening (5) around the hole (7) in the load receiver (2) which is significantly larger than the diameter of the pin (6). The temperature calibrating disk (4) has a plug (8) on its underside with several contacts (9) on the outer edge, which protrudes into the opening (5) without contacting the load receiver (2). The plug (8) establishes an electrical connection with the corresponding mating contacts (10) at the opening (5). The plug (8) has three contacts (9) which are held in a synthetic material part. Thus, the temperature calibrating disk (4) is electrically and mechanically easily connectable with the housing (1) such that it does not contact the load receiver (2).

8 Claims, 3 Drawing Sheets

DRYING BALANCE WITH TEMPERATURE CALIBRATION DISK

The following disclosure is based on German Patent Application No. 29908892.8, filed on May 20, 1999, which is incorporated into this application by reference.

FIELD OF AND BACKGROUND OF THE INVENTION

The invention relates to a drying balance with a pan which rests removably on the load receiver of a weighing system, a radiant source for heating and drying a substance on the pan, and a temperature calibrating disk with at least one built-in temperature sensor.

Drying balances of this kind are known, for example from German Patent Application DE 35 08 271 A1 and from German Patent DE 37 06 609 C1 (corresponding to U.S. Pat. No. 4,798,252).

In the German Patent Application DE 35 08 271 A1, a plug connection to the load receiver provides the electrical contact of the temperature sensor in the temperature calibrating disk. As a result, the load receiver of the drying balance is exposed to vertical forces during plug-in and during removal of the temperature calibrating disk. These vertical forces can damage the sensitive weighing system. In addition, electrical connections must be provided from the load receiver to the electronics mounted in the housing, without having these conductor connections create feedback on the weighing system. In German Patent DE 37 06 609 C1 (U.S. Pat. No. 4,798,252), the temperature calibrating disk is therefore connected, through a flexible cable, to a plug connection fixed to the housing. Due to the connected cable, however, the temperature calibrating disk becomes unwieldy and the handling becomes more difficult because of the need to separately insert a plug.

OBJECTS OF THE INVENTION

It is therefore one object of the invention to provide an improved electric contact arrangement for the temperature calibrating disk of a drying balance.

SUMMARY OF THE INVENTION

According to one formulation of the invention, the above and other objects are achieved in that the load receiver has a vertical hole into which a pin on the underside of the scale pan protrudes. Thereby, the pan is supported by the load receiver and a radiation source heats and dries a substance on the pan. Herein, the term pin not only encompasses a slender, cylindrical part, but also any other shape, such as a flat or curved piece or pieces, that is or are suited to support the pan over the load receiver. In addition, the housing of the balance has an opening around the hole in the load receiver, which is preferably significantly larger than the diameter of the pin. Furthermore, the temperature calibrating disk includes on its underside a plug with several contacts on the outer edge. The plug projects into the housing opening without contacting the load receiver and establishes an electrical connection with corresponding mating contacts at the housing opening.

As a result, separate cables and plug connections such as those required in German Patent DE 37 06 609 C1 (U.S. Pat. No. 4,798,252) are rendered unnecessary. In addition, no forces are transferred to the load receiver when plugging and unplugging the temperature calibrating disk, as is the case in German Patent Application DE 35 08 271 A1, since the mating contacts are situated at the housing of the balance. As a result, even tightly fitting contacts with their good electrical conduction properties can be used without endangering the balance system. Further advantageous formulations and embodiments of the invention are described, shown and claimed herein.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

Figure 1:
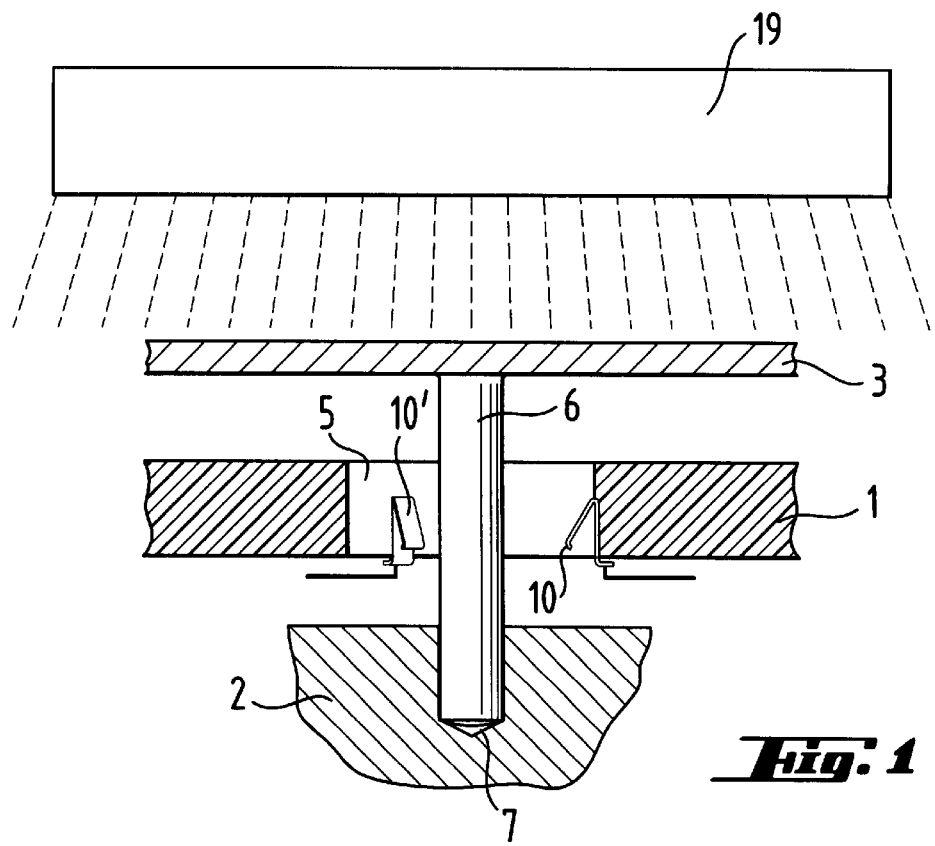
FIGS. 1 and 2 show the parts of the drying balance according to a first embodiment of the invention.
Figure 2:
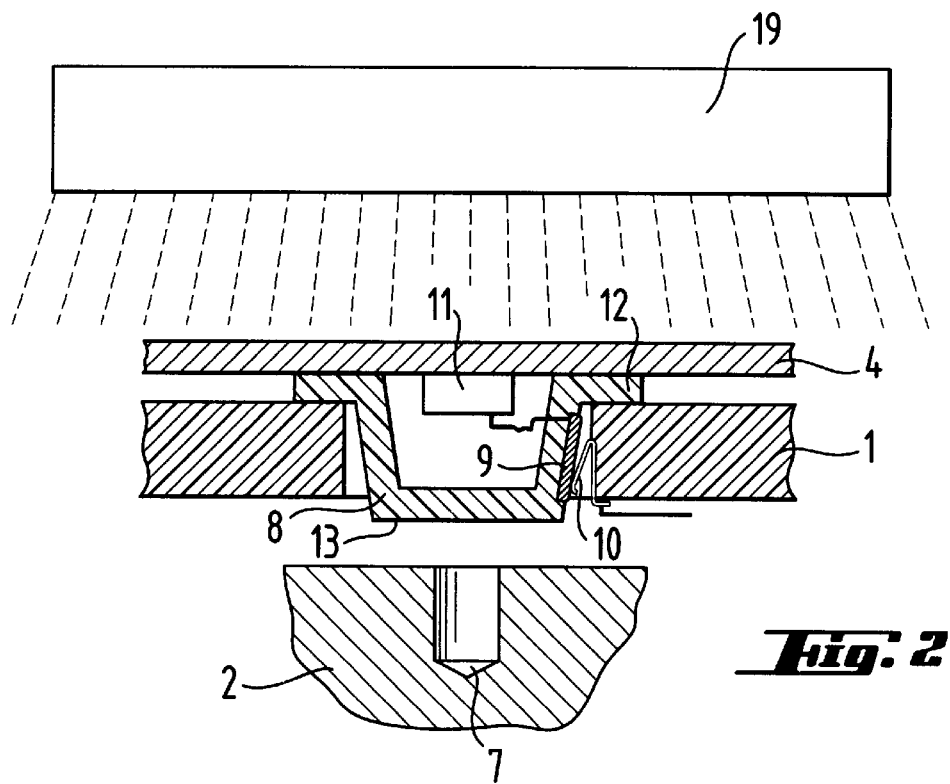

FIGS. 1 and 2 depict a side view of an upwardly pivotable radiant source 19, along with a section view of a portion of a housing 1 of a drying balance and a section view of a part of a load receiver 2. The housing 1 has a—normally round—opening 5 through which a rod-shaped projection or pin 6 on the underside of a pan 3, such as a scale pan or tray, can be inserted into a blind hole 7 in the load receiver 2 (FIG. 1). If the radiant source 19 is pivoted up and the pan 3 thereafter lifted out and removed, a temperature calibrating disk 4 having a plug 8 can be inserted into the opening 5 instead (FIG. 2). At its circumference, the plug 8 has, for example, three contact surfaces 9 of which only one can be seen in FIG. 2. These contact surfaces 9 are in contact with contact springs 10 which are arranged at the edge of the opening 5 in the housing 1. In FIG. 2, one of these contact springs 10 can be seen. In FIG. 1, two of the contact springs (10 and 10') are shown. The contact springs 10 provide both electrical contact between the temperature calibrating disk and evaluating electronics that are fixed to the housing, as well as mechanical support of the temperature calibrating disk in the drying balance. A flange 12 at the plug 8 provides the connection between the plug 8 and the remainder of temperature calibrating disk 4. At the same time, the flange 12 acts as a stop for limiting the depth of the penetration of the plug 8 into the housing 1. The plug 8 is so dimensioned that its lower side 13 can never contact the load receiver 2. A temperature sensor 11, which has a good thermal connection with the metallic temperature calibrating disk 4, can be accommodated in the interior of the plug 8.

The direct fastening of the contact springs 10 at the housing 1 naturally supports an insulating material for the housing 1. Alternatively, if a metal housing is preferred, the contact springs should be provided in, e.g., an insulating bushing in the opening 5.

The parts not depicted or not depicted in detail in FIGS. 1 and 2, such as the radiant source, a weighing system, the electronics, a display etc., are generally known. These parts are shown and described, for example, in German Patent DE 37 06 609 C1 (U.S. Pat. No. 4,798,252) which are incorporated into the patent application by reference. Also, the arrangement used for locking against twisting of the scale pan 3/6 in the load receiver is, for the sake of clarity, not shown. The locking against twisting of the temperature calibrating disk 4 is preferably produced by the shape of the plug 8, which also preferably ensures the proper assignment (not depicted) of the contact surfaces 9 to the contact springs 10.

Figure 3:
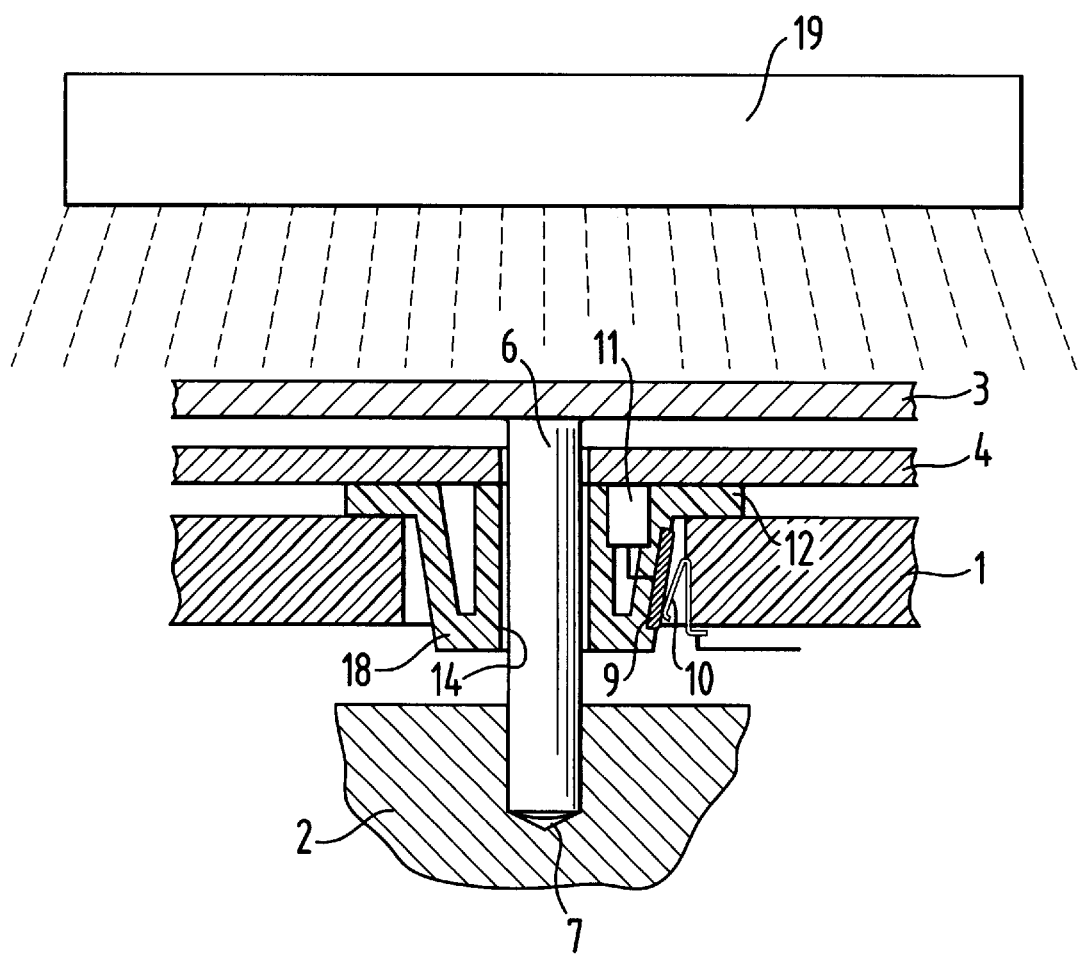
FIG. 3 shows the parts of the drying balance according to a second embodiment of the invention.

A second embodiment of the parts of the drying balance according to the invention is shown in FIG. 3. Parts analogous to those in FIGS. 1 and 2 have like reference numerals and are not explained again. In this embodiment, a plug 18 has a central and vertical through hole 14. The diameter of this hole is large enough that the rod-shaped projection or pin 6 of the scale pan or tray 3 passes through without contacting the plug 18. Therefore, in this embodiment, the temperature calibrating disk 4 as well as the pan 3 can both be inserted and weight measurements can still be performed. The use of the temperature calibrating disk below the pan 3, however, is sensible only if the pan 3 is a pan with a small surface (for example in the form of a narrow cross or a star with narrow arms). Otherwise, the temperature calibrating disk 4 would be isolated too much from the radiation of the radiant source.

Figure 4:
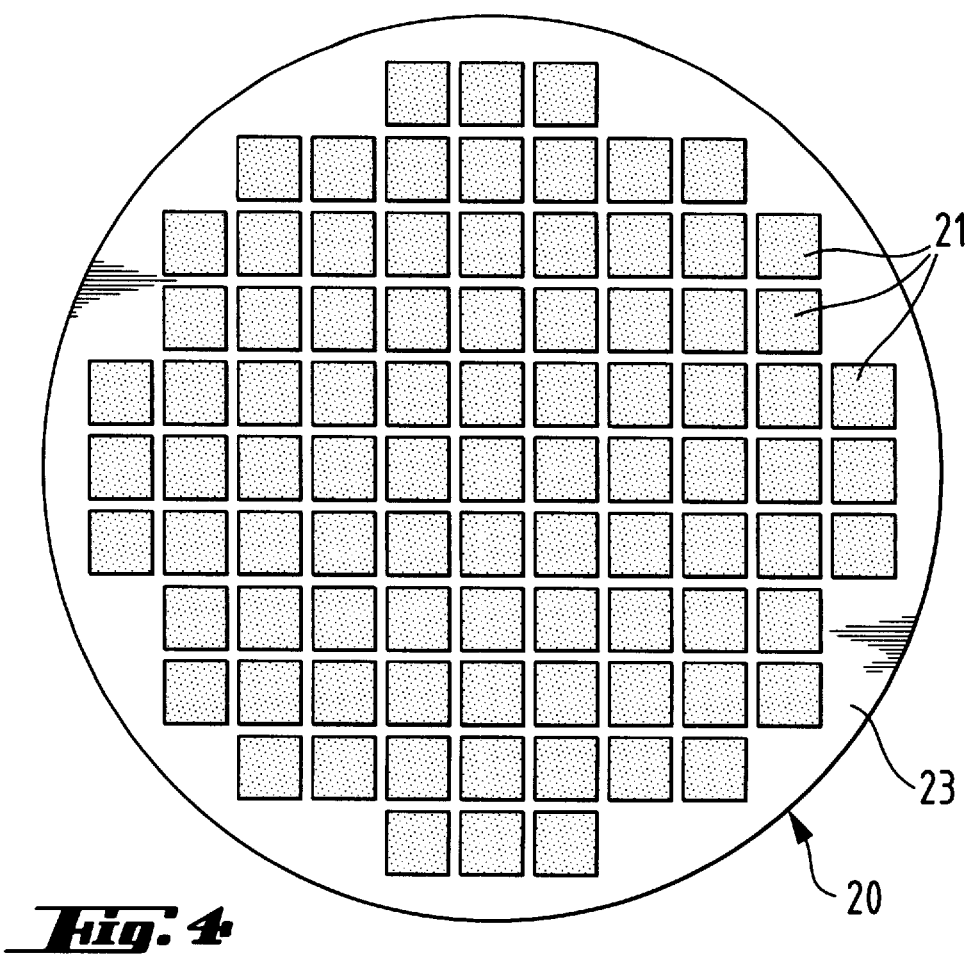
FIG. 4 shows a top-plan view of a temperature calibrating disk with veral temperature sensors in square grid arrangement.
Figure 5:
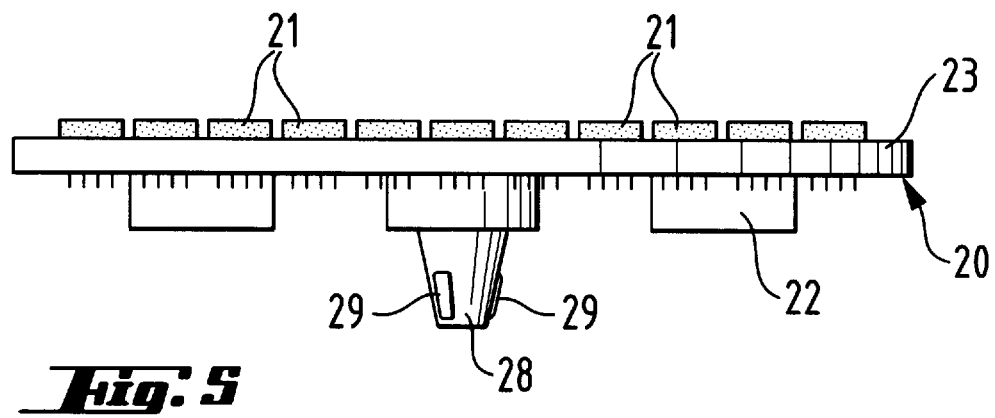
FIG. 5 shows a side view of the temperature calibrating disk of FIG. 4.

In FIGS. 4 and 5, an embodiment of a temperature calibrating disk 20 with several temperature sensors is shown in top view and side view, respectively. The temperature calibrating disk 20 includes a round circuit board 23 on the upper side of which a plurality of temperature sensors 21 are arranged. In the depicted example, a total of eighty-nine rectangular temperature sensors 21 are present, which are arranged one beside the other in a grid. Other symmetrical and equidistant arrangements of the temperature sensors are of course also possible and would be apparent to those skilled in the art. The circuit board already contains the printed circuit for connecting the individual temperature sensors 21 with the electronics 22 for polling the signals of the individual temperature sensors. The electronic components 22 are arranged on the lower side of the circuit board 23 and are thus not exposed to the radiation beams (in FIG. 5 striking from above) from the radiation source. In addition to serial polling of the signals of the individual temperature sensors 21, which are wired in known manner in cells and columns, the electronics 22 convert the signals of the individual temperature sensors into an output signal. This output signal is serially transferred so that all temperature sensor signals can be transferred to the (not depicted) electronics of the drying balance, using only a small number of contacts 29 at a plug 28.

The described and depicted temperature calibrating disks serve to equalize the temperature for moisture measuring instruments, such that these instruments can also be used as reference devices or test means.

The temperature calibrating disk of FIGS. 4 and 5 has the advantage that it also provides information on the spatial uniformity of the temperature distribution so that, for example, in the device of German Patent DE 37 06 901 C1, the settings of the radiant source and/or of the redirecting reflector can be adjusted if needed.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A drying balance, comprising:

a load receiver having a vertical hole;

a pan supported by the load receiver;

a radiation source to heat and dry a substance on the pan;

a pin on an underside of the pan, the pin projecting into the vertical hole of the load receiver;

a housing having an opening with mating contacts, a diameter of the opening being substantially larger than a diameter of the pin on the underside of the pan;

a temperature calibrating disk having at least one temperature sensor; and a plug on the underside of the temperature calibrating disk, the plug having a plurality of contacts on an outer surface of the plug, wherein the plug projects into the opening of the housing without contacting the load receiver and wherein the plug establishes an electrical connection with the mating contacts at the opening of the housing.

2. The drying balance of claim 1, wherein the plug comprises three contacts mounted in a synthetic material of the plug.

3. The drying balance of claim 1, wherein the plug comprises a vertical hole through which the pin passes without contacting the plug.

4. The drying balance of claim 1, wherein the temperature calibrating disk is round and comprises a plurality of temperature sensors which are arranged symmetrically and equidistant from each other in the temperature calibrating disk.

5. The drying balance of claim 4, wherein the plurality of temperature sensors are arranged in the form of a rectangular grid.

6. The drying balance of claim 4, wherein each of the plurality of temperature sensors is rectangularly structured.

7. The drying balance of claim 4, wherein the temperature calibrating disk comprises a circuit board on which connecting conductors are arranged to connect the plurality of temperature sensors with a plurality of electronics components.

8. The drying balance of claim 7, wherein the plurality of electronics components are structured to serially poll the plurality of temperature sensors and to transmit a resulting output signal serially to an evaluation electronics.

* * * * *